US006931973B2

(12) United States Patent
Kuchler

(10) Patent No.: US 6,931,973 B2
(45) Date of Patent: Aug. 23, 2005

(54) SLICING-MACHINE DRIVE

(76) Inventor: Fritz Kuchler, Klatteweg 4-6, Klagenfurt (AT)

( * ) Notice: Subject to any disclaimer, the term of this patent is extended or adjusted under 35 U.S.C. 154(b) by 0 days.

(21) Appl. No.: 10/423,797

(22) Filed: Apr. 25, 2003

(65) Prior Publication Data

US 2003/0200848 A1 Oct. 30, 2003

(30) Foreign Application Priority Data

Apr. 26, 2002 (AT) ........................................ A 648/2002

(51) Int. Cl.[7] .............................. B26D 5/00; G01N 1/06

(52) U.S. Cl. .............................. 83/13; 83/76.7; 83/367; 83/651

(58) Field of Search ........................... 83/13, 76.7, 409, 83/417, 651, 367, 713, 364, 475, 73, 92, 29, 94, 97, 96, 277, 567, 69, 714, 360, 415, 721, 88, 77, 90; 414/45; 271/217

(56) References Cited

U.S. PATENT DOCUMENTS

| | | | | | |
|---|---|---|---|---|---|
| 3,834,259 | A | * | 9/1974 | Kuchler | 83/69 |
| 4,379,416 | A | * | 4/1983 | Kuchler | 83/23 |
| 4,405,186 | A | * | 9/1983 | Sandberg et al. | 414/21 |
| 4,412,483 | A | * | 11/1983 | Hoegh | 99/538 |
| 4,428,263 | A | * | 1/1984 | Lindee et al. | 83/354 |
| 4,532,840 | A | * | 8/1985 | Antonissen | 83/76.8 |
| 4,572,044 | A | * | 2/1986 | Antonissen | 83/42 |
| 4,583,435 | A | * | 4/1986 | Fessler | 83/90 |
| 4,760,765 | A | * | 8/1988 | Nishimoto et al. | 83/92 |
| 4,793,228 | A | * | 12/1988 | Etter et al. | 83/155.1 |
| 4,813,316 | A | * | 3/1989 | Johnson et al. | 83/42 |
| 5,129,298 | A | * | 7/1992 | Cresson et al. | 83/72 |
| 5,216,960 | A | * | 6/1993 | Kuchler | 83/74 |
| 5,241,885 | A | * | 9/1993 | Kuchler | 83/76.7 |
| 5,666,866 | A | * | 9/1997 | Huang et al. | 83/77 |
| 5,787,776 | A | * | 8/1998 | Nishimoto | 83/76.7 |
| 5,862,730 | A | * | 1/1999 | Cartwright et al. | 83/42 |
| 6,418,823 | B1 | * | 7/2002 | Taitler | 83/36 |
| 6,568,307 | B1 | * | 5/2003 | Gunther et al. | 83/367 |
| 6,634,268 | B1 | * | 10/2003 | Guenther et al. | 83/13 |
| 2002/0050198 | A1 | * | 5/2002 | Kuchler | 83/76.8 |
| 2003/0079589 | A1 | * | 5/2003 | Kovacs | 83/42 |
| 2004/0194605 | A1 | * | 10/2004 | Weber | 83/663 |

* cited by examiner

*Primary Examiner*—Allan N. Shoap
*Assistant Examiner*—Ghassem Alie
(74) *Attorney, Agent, or Firm*—Herbert Dubno; Andrew Wilford

(57) ABSTRACT

A slicing machine has a blade having an edge, and a carriage adapted to carry a foodstuff to be sliced and displaceable past the blade edge in forward and reverse directions. A reversible drive on the support is connected to the carriage for displacing it in both directions. A sensor on the support generates an output when the foodstuff on the carriage is generally engaged by the blade edge. A controller connected between the sensor and the drive serves, on forward displacement of the carriage and foodstuff thereon, to forwardly displace the carriage and foodstuff thereon by the drive on generation of the output and subsequently, when the sensor means stops generating the output, displaces the carriage and the foodstuff thereon in the reverse direction by the drive.

11 Claims, 3 Drawing Sheets

SLICING-MACHINE DRIVE

FIELD OF THE INVENTION

The present invention relates to a slicing machine. More particularly this invention concerns a system for driving a motor-operated slicing machine.

BACKGROUND OF THE INVENTION

A standard slicing machine has a carriage that can be reciprocated longitudinally past a normally circular rotating blade to cut slices from a foodstuff, for instance a piece of meat or cheese, sitting on the input carriage. On the other side of the blade the slices are picked up by a conveyor, typically a fork-, belt-, or chain-type arrangement having a support plate and provided with a multiplicity of sharp points so that the slices can be caught as they issue from the downstream side of the blade. The slices are then deposited on an output table which is positioned horizontal underneath the downstream side of the blade. Thus as the input carriage is moved back and forth, slices are cut from the foodstuff thereon, these slices pass the. blade and are picked up the conveyor, and the transfer fork deposits them in a stack on the output table, which itself can shift horizontally to array the incoming slices. The system is operated by a computer-type controller having a light-curtain sensor that detects when the leading edge of the foodstuff comes into contact with the blade and when the blade reaches its trailing edge. Such machines are described in detail in my earlier U.S. Pat. Nos. 4,185,527, 4,217,650, 4,338,836, 4,379,416, 4,586,409, 4,598,618, 4,763,738, and 4,867,257. They can calculate slice thickness, portion size, and the like and can produce ready-to-sell packages of neatly arrayed slices.

In automatic machines the input carriage is reciprocated past the blade by a drive. Normally a simple crank arrangement that moves it through a stroke equal to full travel of the input table is used.

In manual machines the input carriage is pushed by the operator past the blade. Obviously until the foodstuff is in contact with the blade, the carriage moves easily on its guides. Once the blade starts to cut, however, the operator has to apply some force, and even after the cut is complete when the foodstuff is still riding against the face of the blade, it takes some force to retract the carriage and start another slice. In practice the job of manually cutting even a small portion of a hard foodstuff, e.g. provolone, can be somewhat tiresome, and of course large jobs become a fair amount of work.

OBJECTS OF THE INVENTION

It is therefore an object of the present invention to provide an improved slicing machine.

Another object is the provision of such an improved slicing machine which overcomes the above-given disadvantages, that is which has a drive that makes it easier to use the slicing machine both for manual and automatic slicing operations.

Yet another object is to provide an improved method operating a slicing machine.

SUMMARY OF THE INVENTION

A slicing machine has a support, a blade on the support and having an edge, and a carriage adapted to carry a foodstuff to be sliced and displaceable on the support past the blade edge in a forward direction and in an opposite reverse direction. A reversible drive on the support is connected to the carriage for displacing it in the forward and reverse directions. A sensor unit on the support generates an output when the foodstuff on the carriage is generally engaged by the blade edge. A controller connected between the sensor and the drive serves, on displacement in the forward direction of the carriage and foodstuff thereon, to displace the carriage and foodstuff thereon by the drive in the forward direction on generation of the output and subsequently, when the sensor stops generating the output, displaces the carriage and the foodstuff thereon in the reverse direction by the drive. Thus as the foodstuff engages the blade edge the drive takes over forward movement of the carriage and after a slice is cut from the foodstuff the drive reverses the carriage.

This system can be used for a simple power-assist or fully automatic operation of the slicer. In power-assist mode as soon as the foodstuff touches the blade edge and is detected by the sensor, the drive takes over and moves the carriage past the blade, without any further action on behalf of the machine operator. Once the foodstuff has completely passed the blade edge, which only occurs when the slice has been cut from it, the sensor detects this and the controller reverses movement of the carriage until the foodstuff is moved all the way back past the blade. Hence in power-assist mode all the user need do to cut a slice off the foodstuff is press the foodstuff against the blade edge. The remaining operation is all taken care of by the drive.

In automatic mode the drive takes over and repeatedly reciprocates the carriage back and forth past the blade edge until the desired number of slices has been cut or some other occurrence, for instance close juxtaposition of a pusher plate with the slice abutment plate, happens. Once again, all the machine operator need do is start the operation by pressing the foodstuff against the blade edge.

The drive according to the invention includes a motor and a clutch connected between the motor and the carriage. It also has a transmission having an input connected to the motor and a pair of oppositely rotating outputs. The clutch is connected between one of the outputs and the carriage, and a second clutch separate from the first-mentioned clutch is connected between the other of the outputs and the carriage. The controller is connected to both of the clutches for alternately operating same. A simple belt drive can be used to oppositely rotate a pair of wheels carrying the two clutches. The motor can be the very same motor used to rotate the blade, so that the benefits of the invention are achieved in a system with substantially the same mechanism as known systems.

According to another feature of the invention, the transmission includes a slip coupling connected between the motor and the carriage. This coupling allows the blade, which is operated by the same motor as the carriage, to continue rotating at full speed even when the carriage is being slowed down, for instance when a particularly hard food stuff is being sliced. The slip coupling can be at the transmission input. More particularly the transmission has a pair of the inputs, one of which is formed by the slip coupling. The drive includes a step-down transmission connected between the motor and the other of the transmission inputs. Furthermore the drive includes a pair of motor clutches one of which is connected between the motor and the slip coupling and the other of which is connected between the motor and the step-down transmission. The controller operates the motor clutches alternately. This arrangement is particularly useful in that, in automatic mode, it sets the carriage to moving at a slow pace certain to allow the blade to cut smoothly and neatly through any food stuff. In power-assist mode a higher speed mediated by some slippage in the coupling is used.

The sensor forms a light curtain at the edge. More particularly a light source can direct a beam right past the edge, with the beam being reflected back to a photocell mounted right near the light source, so all the electrical parts of the sensor are in one place, preferably above the cutting area so they are out of harm's way.

The method according to the invention comprises the steps of, on displacement in the forward direction of the carriage and foodstuff thereon, displacing the carriage and foodstuff thereon by the drive in the forward direction on generation of the output, and subsequently, when the sensor stops generating the output, displacing the carriage and the foodstuff thereon in the reverse direction by the drive so that, as the foodstuff engages the blade edge the drive takes over forward movement of the carriage and, after a slice is cut from the foodstuff, the drive reverses the carriage. According to the invention the carriage can be displaced afterward, when in automatic mode, in the forward direction by the drive so that another slice is cut from the food stuff.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
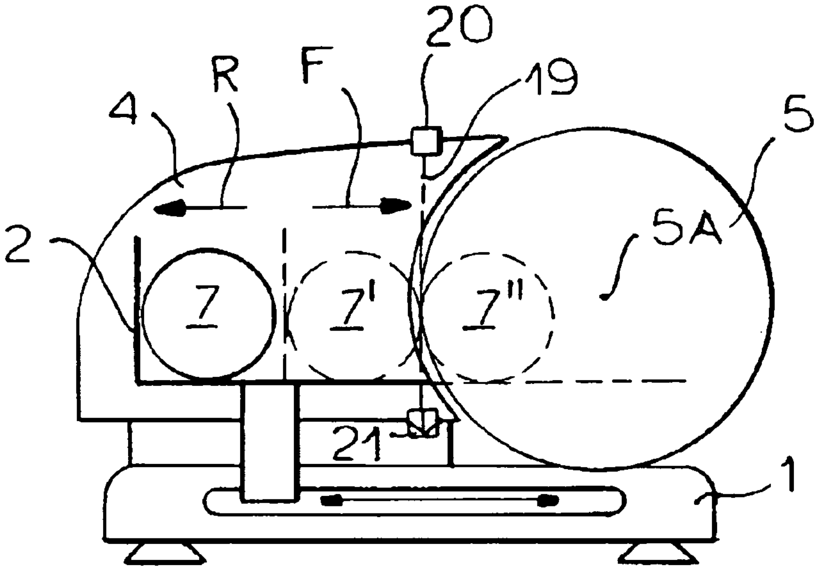
FIG. 1 is a small-scale side view of a slicing machine according to the invention.
Figure 2:
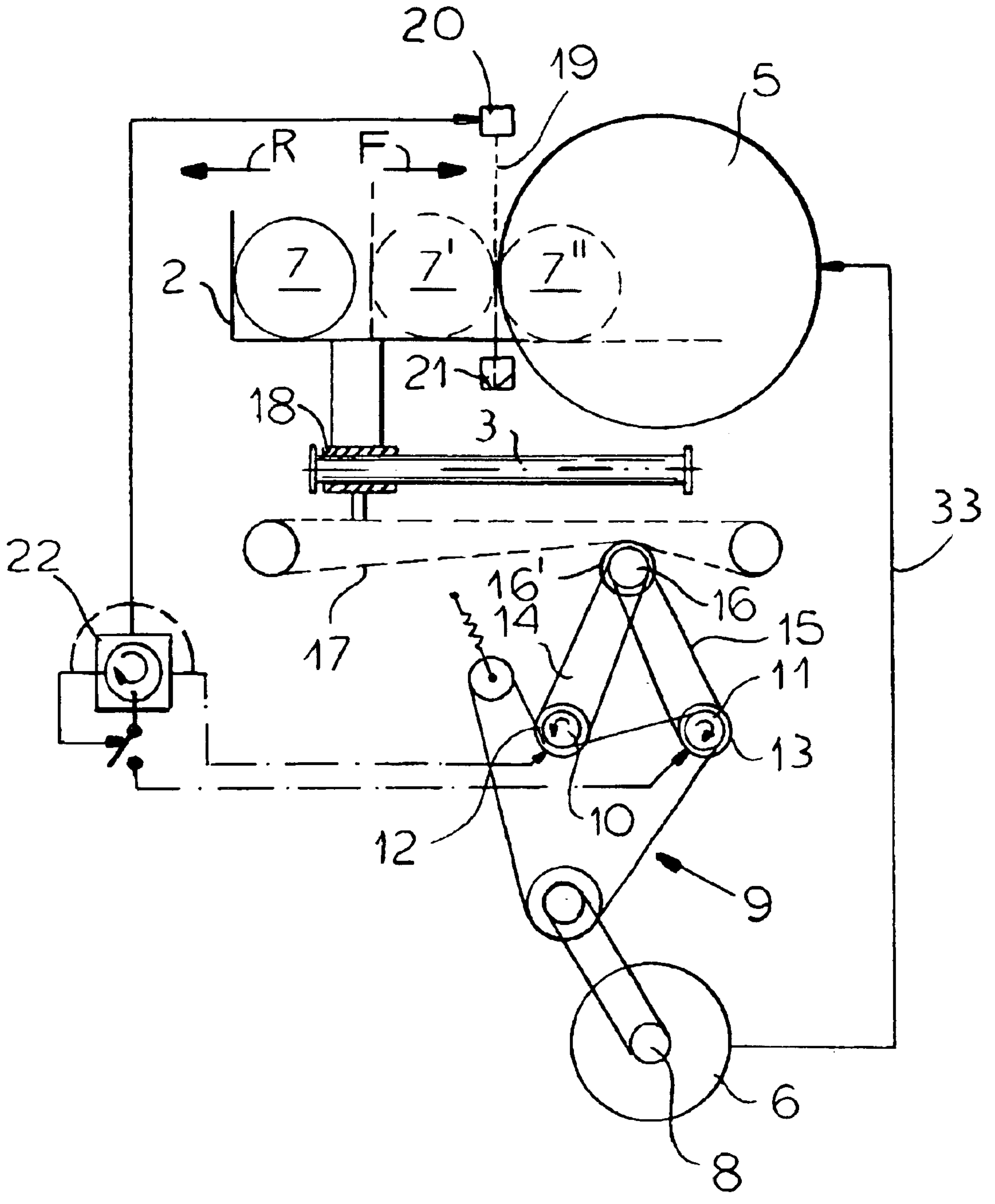
FIG. 2 is a largely diagrammatic view of the drive for the slicing machine of FIG. 1.

As seen in FIGS. 1 and 2 a slicing machine 1 has a base 1 on which an input carriage 2 is horizontally reciprocal on guide rods 3 in a forward direction F and an opposite backward or reverse direction R. A planar circular blade 5 rotatable about a horizontal axis 5A perpendicular to the directions F and R is spaced axially from a vertical abutment fence 4 extending parallel to these directions F and R. A unidirectional motor 6 is connected permanently to the blade 5 via a connection illustrated schematically at 33 to drive it at about 300 RPM. Thus a foodstuff 7, here some kind of wurst that is sitting on the carriage 2, can be moved past the blade 5 to cut from it a slice that falls on an output table not illustrated here. The foodstuff 7 moves from the starting position shown in solid lines in FIG. 1 to a position shown at 7' when the blade 5 just starts cutting into it to a position shown at 7" when the blade has finished cutting a slice off its end. A pickup and arraying system for the cut slices can be provided, but is not relevant to this invention.

According to the invention the motor 6 has an output 8 that continuously drives a belt 9 in one direction and that, as is standard, continuously rotates the blade 5. This belt 9 is spanned under a forward clutch 12 and over a reverse clutch 13 connected to respective pulleys 10 and 11 connected in turn by respective belts 14 and 15 to a common drive wheel 16. A slip coupling 16' connects this wheel 16 in turn to a belt 17 having an upper stretch connected to a shoe 18 by means of which the carriage 2 slides on the guide 3. The clutches 12 and 13 are operated alternately by a controller 22, that is either one of the clutches 12 and 13 is transmitting torque or neither is. Never are both clutches 12 closed at the same time. Thus when the clutch 12 is closed the carriage 2 moves in the forward direction F and when the clutch 13 is closed the carriage 2 moves in the reverse direction R. The belt 17 could be replaced by a rack engaged by a gear carried on the slip coupling 16'.

A light curtain 19 on the support 1 formed by a send/receive unit 20 and a reflector 21 can determine when the foodstuff 7 passes between the positions 7' and 7", that is at the start of a slice when it enters into contact with the blade 5 and at the end of a slice when the blade 5 passes completely through the foodstuff 7. The unit 20 has a laser whose beam is sent back by a prism in the reflector 21 to a photocell in the unit 20, so that these sensitive parts can be positioned above the work area, out of harm's way.

According to the invention the controller 22 is connected to the light curtain 19 and to the clutches 12 and 13 to operate the slicing machine as follows:

In the starting position shown in FIG. 1 in solid lines, the motor 6 spins the blade 5, but both clutches 12 and 13 are open so that the carriage 2 is stationary.

After loading the foodstuff 7 onto the carriage 2 and pressing it against the abutment plate 4, the user pushes the carriage 2 manually forward in direction F toward the blade 5. As soon as the foodstuff 7 contacts the blade 5, in position 7', the beam of the light curtain 19 will be broken and it will send a signal to the controller which will close the clutch 12, thereby connecting the carriage 2 to the motor 6 to move this carriage 2 in the forward direction. The user can at this time release the carriage 2 as it will advance on its own.

Once the slice is complete, in the position 7", the beam of the light curtain 19 will be reflected back and another signal will be sent to the controller 22 which in turn will simultaneously open the clutch 12 and close the clutch 13. The carriage 2 will be reversed to move back in the direction R. Once again, this is done without operator intervention; the machine just cuts off the slice and reverses.

When the carriage 2 returns to position 7' either of two things can occur:

In power-assist mode the controller 22 opens the reversing clutch 13 when the position 7' is reached. The clutch 12 remains open, so the carriage 2 just stops. If the user wants another slice he or she just gives the carriage 2 a little push in the direction F to start the forward/reverse slice cycle again.

In automatic mode, when the position 7' is reached the clutch 13 is opened and the clutch 12 is closed to reverse the carriage 2 and make another slice. This can be repeated a number of times programmed into the controller 22, or until the user intervenes to stop the slicing operation.

In both modes, the carriage 2 does not need to return to the starting position shown in solid lines in FIG. 2 between successive slices. This substantially reduces the cutting time.

When in the power-assist mode, the slip coupling 16' can allow a 300 RPM speed to be used with a 500–700 RPM motor. The slip coupling 16' is overdriven to allow the carriage 2 to be moved at a slower speed than the motor 6 would normally establish. Thus in the power-assist mode the carriage 2 will not be yanked by the motor drive out of the operator's hand.

Figure 3:
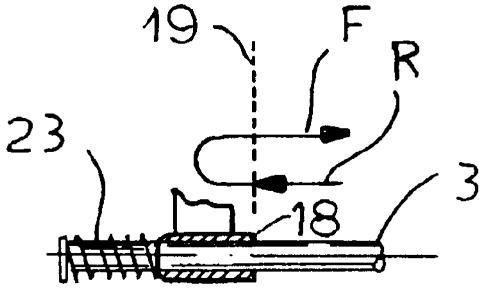
FIG. 3 is a view of an alternative detail of the slicing-machine drive.

FIG. 3 shows how a spring 23 can be provided that pushes the carriage shoe 18 in the direction F. This spring 23 therefore makes the slicing operation automatic by pushing the carriage 2 back toward the blade 5 once the reversing clutch 13 is opened on the reverse stroke.

Figure 4:
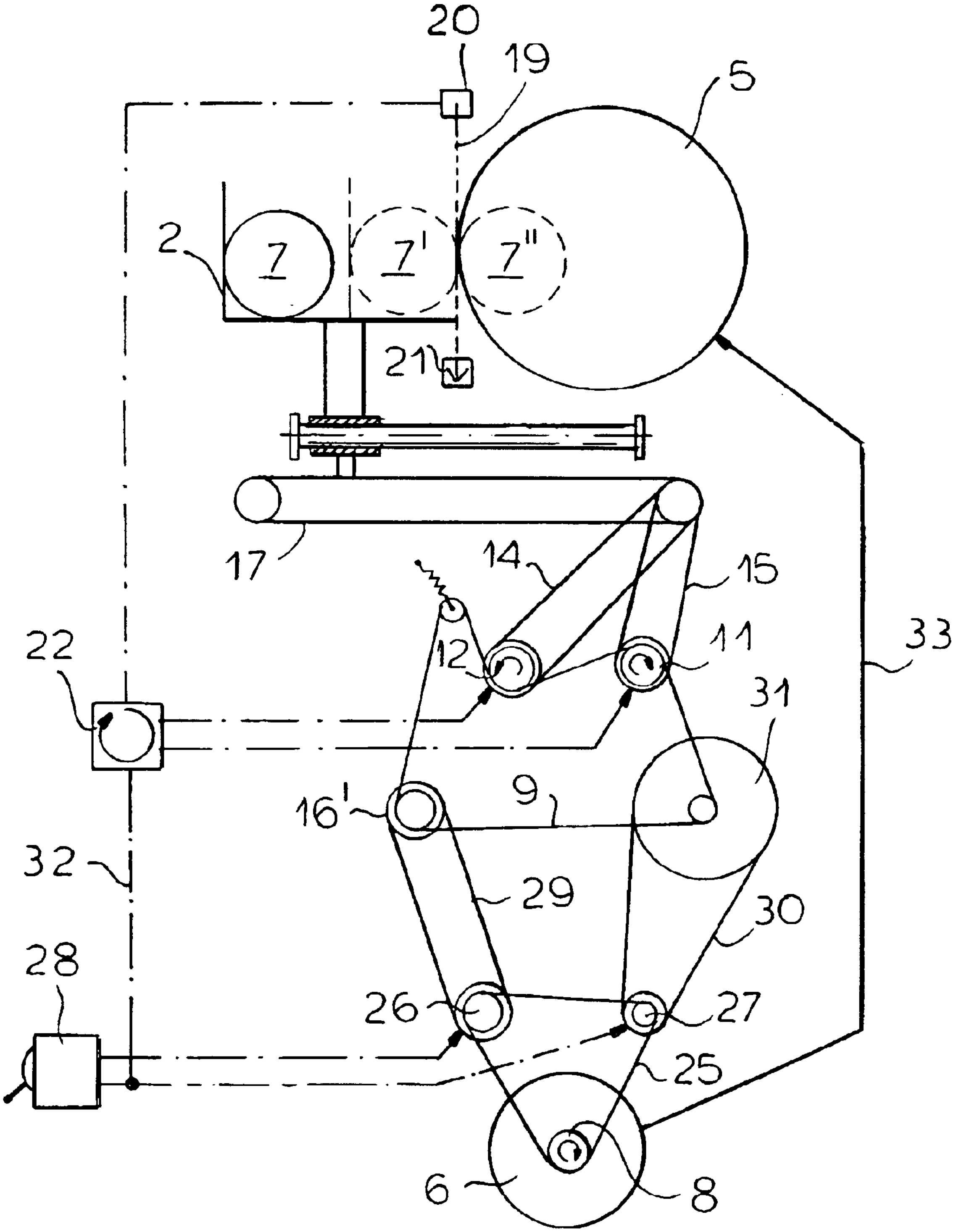
FIG. 4 is a view like FIG. 2 of another slicing-machine drive in accordance with the invention.

Whereas the system of FIGS. 1–3 is intended primarily as a power-assist slicer intended to reduce the force an operator needs to apply to the machine to slice up the foodstuff 7, in the system of FIG. 4 a separate low-speed drive 31 is provided for full-automatic slicing.

More particularly, FIG. 4 shows how the main drive motor 6 is connected via a belt 25 to a pair of clutches 26 and 27, the former connected via a belt 29 to a slip coupling 16' that drives the belt 9, the latter via a belt 30 to a 3:1 step-down transmission 31 whose output is connected to the belt 9 . A switch 28 connected via a line 32 to the controller 22 and to the clutches 26 and 27 can switch between the above-described modes for the system of FIG. 2 and a wholly automatic mode.

More particularly when the clutch 26 is closed and the clutch 27 is open, the system works substantially as described with reference to FIG. 2, in either power-assist or full-automatic mode.

When, however, the clutch 26 is open and the clutch 27 is closed, the system runs in slow-speed full-automatic mode. The belt 9 is driven through the step-down transmission 31 so that the carriage 2 is stroked slowly back and forth past the blade 5. This slower speed is useful when the machine is being set to run unattended, as it lessens stress on the various elements of the slicing machine and lessens the likelihood of accidents.

I claim:

1. A slicing machine comprising:

a support;

a blade on the support and having an edge;

a carriage adapted to carry a foodstuff to be sliced and displaceable on the support past the blade edge in a forward direction and in an opposite reverse direction;

reversible drive means on the support and connected to the carriage for displacing it in the forward and reverse directions;

sensor means on the support for generating an output when the foodstuff on the carriage is generally engaged by the blade edge; and control means connected between the sensor means and the drive means for, on displacement in the forward direction of the carriage and foodstuff thereon, displacing the carriage and foodstuff thereon by the drive means in the forward direction on generation of the output and for subsequently, when the sensor means stops generating the output, displacing the carriage and the foodstuff thereon in the reverse direction by the drive means, whereby as the foodstuff engages the blade edge the drive means takes over forward movement of the carriage and after a slice is cut from the foodstuff the drive means reverses the carriage.

2. The slicing machine defined in claim 1 wherein the drive means includes a motor and a clutch connected between the motor and the carriage.

3. The slicing machine defined in claim 2 wherein the drive means has an input connected to the motor and a pair of oppositely rotating outputs, the clutch being connected between one of the outputs and the carriage, the drive means further comprising a second clutch separate from the first-mentioned clutch, connected between the other of the outputs and the carriage, the control means being connected to the clutches for alternately operating same.

4. The slicing machine defined in claim 3 wherein the drive means includes a slip coupling connected between the motor and the carriage.

5. The slicing machine defined in claim 4 wherein the slip coupling is at the input.

6. The slicing machine defined in claim 5 wherein the drive means has a pair of the inputs, one of which is formed by the slip coupling, the drive means including a step-down transmission connected between the motor and the other of the transmission inputs.

7. The slicing machine defined in claim 6 wherein the drive means includes a pair of motor clutches one of which is connected between the motor and the slip coupling and the other of which is connected between the motor and the step-down transmission, the control means operating the motor clutches alternately.

8. A method of operating a slicing machine having:

a support;

a blade on the support and having an edge;

a carriage adapted to carry a foodstuff to be sliced and displaceable on the support past the blade edge in a forward direction and in an opposite reverse direction;

reversible drive means on the support and connected to the carriage for displacing it in the forward and reverse directions;

sensor means on the support for generating an output when the foodstuff on the carriage is generally engaged by the blade edge, the method comprising the steps of:

a) on displacement in the forward direction of the carriage and foodstuff thereon, displacing the carriage and foodstuff thereon by the drive means in the forward direction on generation of the output; and subsequently b) when the sensor means stops generating the output, displacing the carriage and the foodstuff thereon in the reverse direction by the drive means, whereby, as the foodstuff engages the blade edge the drive means takes over forward movement of the carriage and after a slice is cut from the foodstuff, the drive means reverses the carriage.

9. The method defined in claim 8, further comprising the step, after step b) of c) displacing the carriage and the foodstuff thereon in the forward direction by the drive means, whereby another slice is cut from the food stuff.

10. A slicing machine comprising:

a support;

a blade on the support and having an edge;

a carriage adapted to carry a foodstuff to be sliced and displaceable on the support past the blade edge in a forward direction and in an opposite reverse direction;

a reversible drive means on the support and connected to the carriage for displacing it in the forward and reverse directions, the drive means including a motor, first and second oppositely rotating outputs driven by the motor, and respective first and second clutches connected to the outputs;

sensor means on the support for generating an output when the foodstuff on the carriage is generally engaged by the blade edge; and control means connected between the sensor means and the drive means for, on displacement in the forward direction of the carriage and foodstuff thereon, closing the first clutch and opening the second clutch to displace the carriage and foodstuff thereon by the drive means in the forward direction on generation of the output and for subsequently, when the sensor means stops generating the output, opening the first clutch and closing the second clutch to displace the carriage and the foodstuff thereon in the reverse direction, whereby as the foodstuff engages the blade edge the drive means takes over forward movement of the carriage and after a slice is cut from the foodstuff the drive means reverses the carriage.

11. A slicing machine comprising:

a support;

a blade on the support and having an edge;

a carriage adapted to carry a foodstuff to be sliced and displaceable on the support past the blade edge in a forward direction and in an opposite reverse direction;

reversible drive means on the support and connected to the carriage for displacing it in the forward and reverse directions;

sensor means on the support for forming a light curtain at the edge and generating an output when the foodstuff on the carriage is generally engaged by the blade edge; and control means connected between the sensor means and the drive means for, on displacement in the forward direction of the carriage and foodstuff thereon, displacing the carriage and foodstuff thereon by the drive means in the forward direction on generation of the output and for subsequently, when the sensor means stops generating the output, displacing the carriage and the foodstuff thereon in the reverse direction by the drive means, whereby as the foodstuff engages the blade edge the drive means takes over forward movement of the carriage and after a slice is cut from the foodstuff the drive means reverses the carriage.

* * * * *